United States Patent [19]
Herring et al.

[11] 3,984,804
[45] Oct. 5, 1976

[54] ACOUSTIC AND SEISMIC TROOP MOVEMENT DETECTOR

[75] Inventors: Theodore C. Herring, New Hope; Edgar A. Reed, 3rd, Ambler, both of Pa.

[73] Assignee: The United States of America as represented by the Secretary of the Navy, Washington, D.C.

[22] Filed: Nov. 29, 1971

[21] Appl. No.: 202,996

[52] U.S. Cl. .............................. 340/17 R; 181/122; 181/402; 340/15
[51] Int. Cl.² ........................................... G01V 1/16
[58] Field of Search ................ 340/17, 15, 9; 343/6; 181/5 EC, 122, 402

[56] References Cited
UNITED STATES PATENTS

| | | | |
|---|---|---|---|
| 2,402,459 | 6/1946 | Smith | 343/6 R |
| 3,304,547 | 2/1967 | Bristol | 340/15 |
| 3,360,772 | 12/1967 | Massa | 340/17 |
| 3,445,809 | 5/1969 | McLoad | 340/17 |
| 3,517,316 | 6/1970 | Anderson et al. | 340/17 |

*Primary Examiner*—Harold Tudor
*Attorney, Agent, or Firm*—R. S. Sciascia; Henry Hansen

[57] ABSTRACT

A remote troop movement detector comprising a common detector assembly or canister including a microphone and a seismometer together with a power supply and a transmitter circuit, formed to combine to adapt to various deployment situations. In one of its embodiments the detector canister is combined with a flotation collar and an anchor for waterborne deployment, in a second embodiment the canister is combined with a drag plate and a ballasted forward spike to form an aerodynamically stable configuration having a thin metal cone frustum intermediate the spike and the assembly for limiting and attenuating the ground penetration impact following an airdrop, and in a third embodiment the assembly is combined with a narrow tip for manual implantation.

10 Claims, 6 Drawing Figures

ACOUSTIC AND SEISMIC TROOP MOVEMENT DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to remote detectors and more particularly to remote troop movement detectors which are both responsive to acoustic and seismic noise.

In military operations, and in particular in military operations where the movement of the enemy on the ground cannot be directly ascertained, the requirement for a remote detector of personnel is well-recognized and many such detector configurations have been developed in the prior art. Generally such detectors where either of the acoustic or the seismic type responsive to either the acoustic noise associated with the movement of personnel and vehicles or seismic noise generated by land vehicles. For such applications the characteristic attenuation of the noise associated with troop movement, the typical background noise of the environment and power limitations dictate a detector configuration which is not easily discovered such that detection can be made before the detector is observed. Along the same requirements it is generally desired that the positioning of the sensor or its deployment do not themselves present large signatures which would cause the enemy personnel to identify and avoid the location. Accordingly there is a great necessity for detector configurations which can be configured for airdrop and are at the same time of sufficiently small dimensions to be easily carried by ground patrols. Furthermore in order to reduce logistics a common detector configuration is desired for many environments including deployment detection of enemy personnel moving through water. Many of the prior art devices are adapted for a particular environment and broader requirements usually are accompanied by larger configurations. Such highly specialized configurations require large logistic support being at the same time cumbersome and inflexible for various deployment situations.

SUMMARY OF THE INVENTION

Accordingly, it is the general purpose and object of the present invention to provide a common acoustic and seismic detector which is easily modified for air drop, waterborne deployment or manual deployment. Other objects of the invention are to provide a detector responsive to both acoustic and seismic noise which is relatively simple and which requires few parts.

Briefly, these and other objects are accomplished within the present invention by providing a common troop movement detector contained in a canister comprising a microphone exposed to atmosphere at the topside of the canister and a seismometer abutting the other or bottom side, a power supply or battery and a transmitter circuit. In one embodiment the canister is combined with a flotation collar and an anchor assembly for waterborne deployment. In another embodiment the canister is combined with a drag plate attached by spring clips on the top side thereof and a conical assembly on the other side where the forward assembly includes a thin sheet cone frustum intermediate a forward spike and the canister for attenuation of ground impact through deformation. In this embodiment the configuration forms a stable aerodynamic body which is airdropped and which reaches a predetermined terminal velocity prior to impact. The forward spike is formed from solid metal to provide the required center of gravity location for stable flight and to penetrate ground. Furthermore the spike is formed in the shape of a relatively narrow cone and the frustum is flared to a wider cone angle proximate the aft or top end such that penetration depth at impact is substantially at the frustum for all soil hardnesses. In yet another embodiment the canister is combined with a narrow conical tip for manual implantation.

DESCRIPTION OF THE PREFERRED EMBODIMENT

Figure 1:
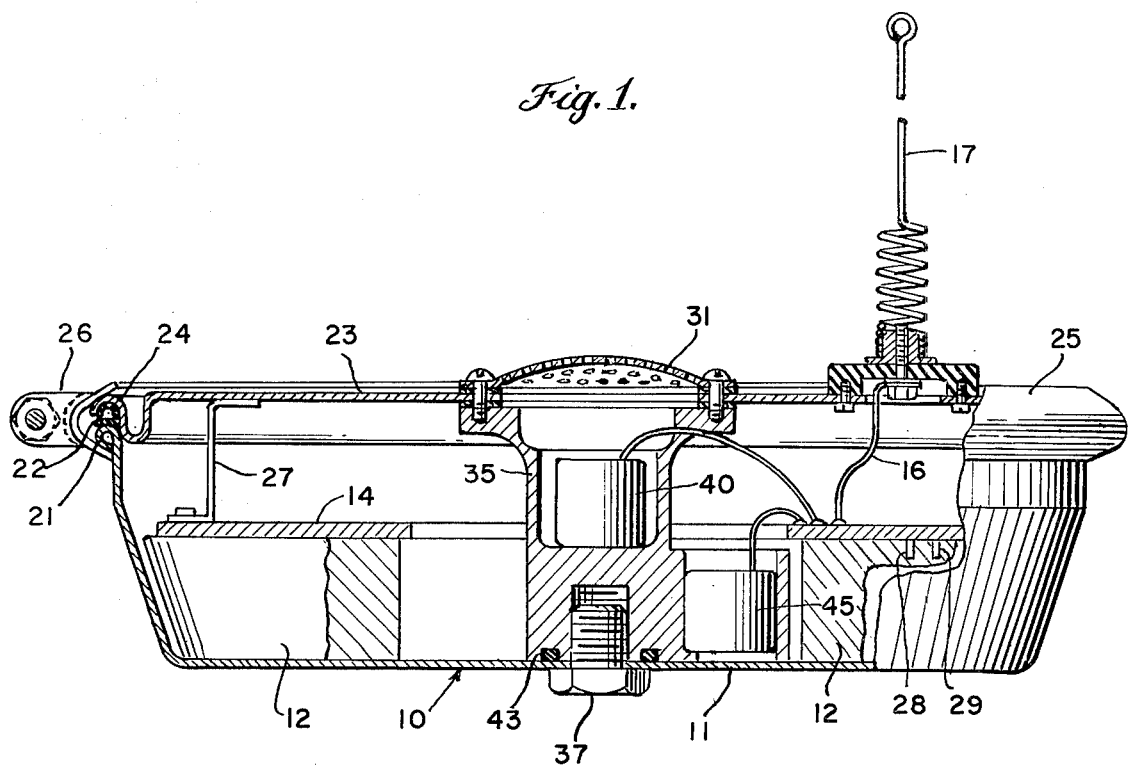
FIG. 1 is a side view in partial cross section of an instrument canister constructed according to the present invention.

As shown in FIG. 1, a common detector instrument canister 10 comprises a circular bottom pan 11 containing a battery 12 formed in the general configuration of a toroid and dimensioned to substantially conform to the shape of pan 11. Attached on the upper surface of battery 12 is a circuit board 14 formed in the general shape of an angular disc to substantially conform with the upper surface of battery 12, comprising a transmitter circuit further described hereinbelow. Bottom pan 11 is generally circular and dished forming a sealing bead 21 around the periphery thereof formed to mate with a circular gland seal 22. Abutting the top side of gland seal 22 is a coverlid assembly 23 having formed therein a convoluted circular lip 24 around the periphery thereof formed to mate with gland seal 22 and to register with pan 11.

When in position lid assembly 23 is attached to bead 21 by a hoop clamp 25, such as a Marman clamp for example, formed to engage the distal edges of lip 24 and bead 21 for urging the edges towards each other and compressing seal 22 therebetween by reducing the circumference of the hoop. A screw-nut assembly 26 connected between the terminal tabs of hoop clamp 25 provides the means for adjustment of the circumference thereof. Lid assembly 23 forms an opening in the center thereof closed on the outside by a perforated microphone screen 31. Also connected to lid assembly 23 is a conventional antenna 17 passing through an insulated insert to the inside of canister 10 to connect by a connector 16 to circuit board 14. Attached to the underside of lid assembly 23 and extending to abut with pan 11 through the annulus of battery 12 when in position is a sensor housing 35. Housing 35 forms a microphone cavity aligned with the opening in lid assembly 23 and a seismometer cavity adjacent the bottom of pan 11. A conventional microphone 40 and seismometer 45 are affixed to within the respective cavities and are connected to respective terminals on circuit board 14 for amplification and transmission.

At the bottom end housing 35 forms a female threaded receptacle 41 aligned to mate with a central hole in pan 11 including a sealing ring groove 43 formed in the bottom surface thereof surrounding receptacle 41 and containing an O-ring seal 44. A bolt 37 is inserted into receptacle 41, compressing seal 44 and attaching housing 35 to pan 11.

Also attached to the underside of lid assembly 23 and extending downwards to attach at the other end to circuit board 14 are a plurality of attachment straps 27 connecting lid assembly 23 and the circuit board 14 to form an integral unit for easy extraction and maintenance. When in position circuit board 14, at the bottom surface thereof, registers with battery 12 at two connectors 28 and 29, completing the circuit with battery 12.

Figure 3:
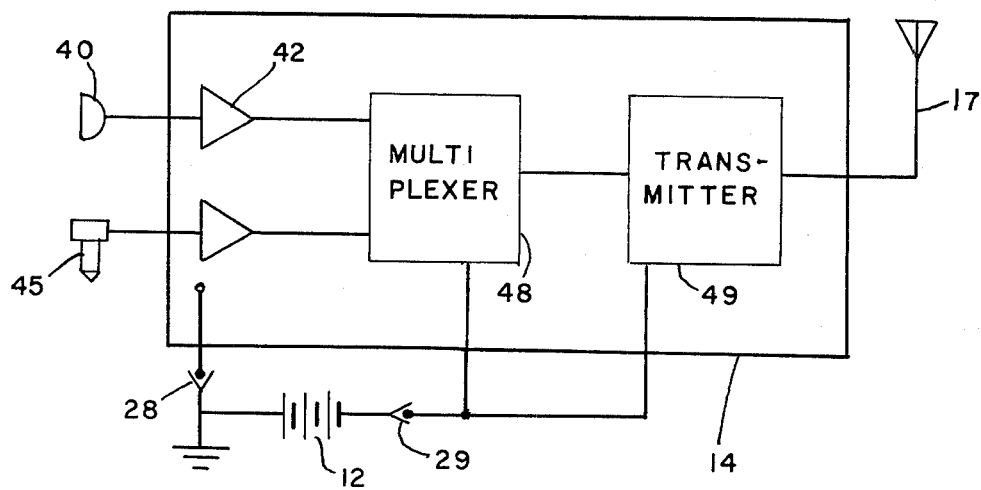
FIG. 3 is a perspective view of one embodiment of the present invention.

As shown in FIG. 3, circuit board 14 comprises a printed circuit which by conventional means is arranged to form a transmitter comprising a first amplifier 42 connected to receive the output signal of microphone 40, a second amplifier 47 connected to receive the output signal of seismometer 45, a multiplexer 48 of any conventional type connected to receive the output signals from amplifiers 42 and 47 and a conventional transmitter 49 receiving the output signal from multiplexer 48. The output of transmitter 49 is connected to antenna 17 and the respective circuit components are also connected to battery 12 for power.

Figure 2:
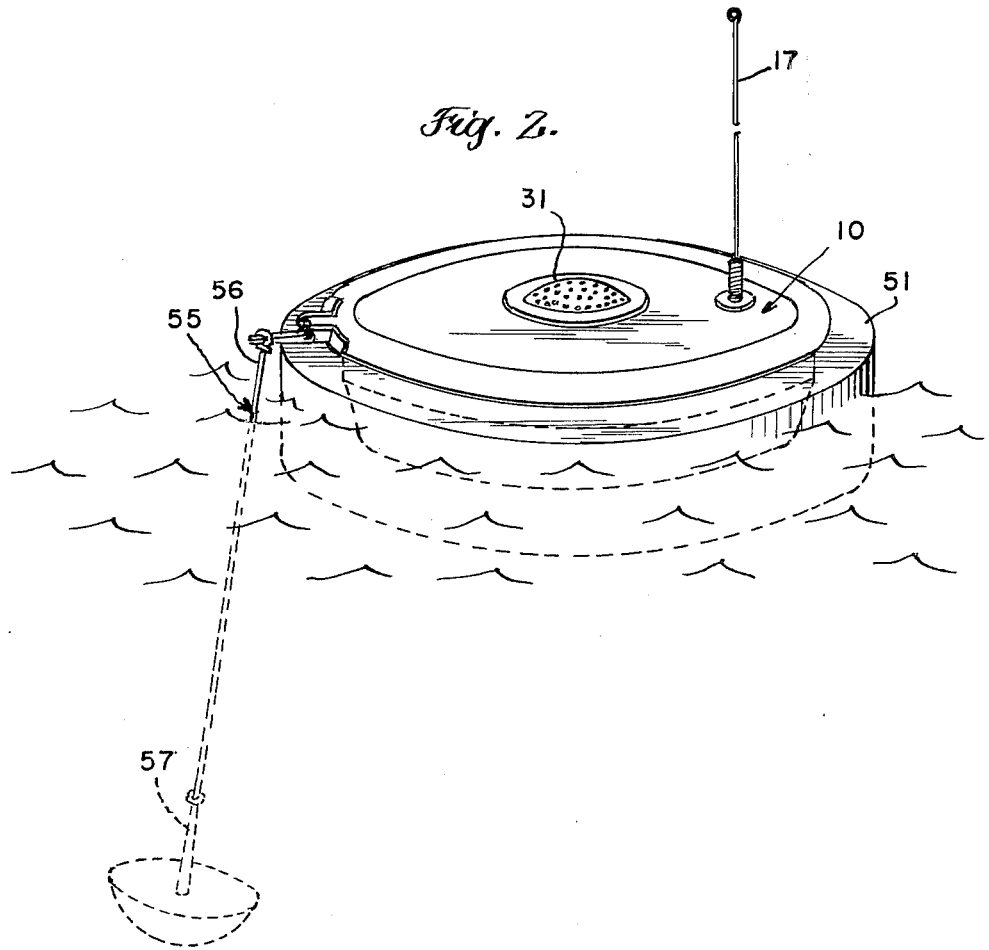
FIG. 2 is a block diagram of a transmitter circuit constructed according to the present invention.

As shown in FIG. 2, one embodiment of the present invention comprises assembly 10 combined with a flotation collar 51 formed to fit the periphery of pan 11 and abutting the bottom edge of clamp 25. Attached to the screw-nut assembly 26 of clamp 25 is an anchor assembly 55 comprising an anchor cable 56 terminating at an anchor 57. In this configuration, assembly 10 can be deployed in any volume of water and affixed by anchor 57 to maintain station.

Figure 4:
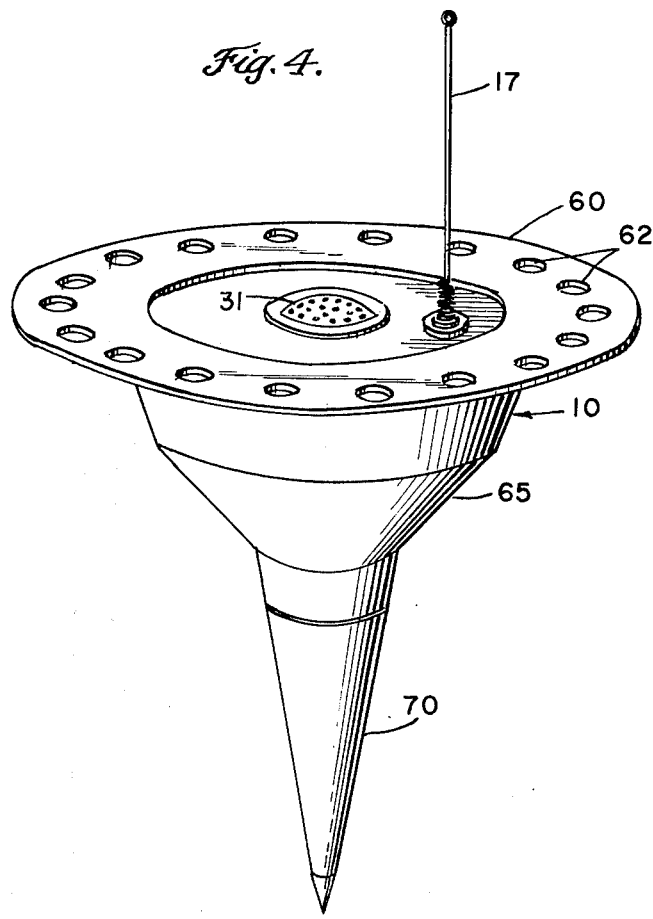
FIG. 4 is a perspective view of another embodiment constructed according to the present invention.

As shown in FIG. 4, another embodiment of the present invention comprises canister 10 including a drag plate 60 attached to the lid assembly 23 and a cone frustum 65 tapering away from pan 11 terminating in a spike 70 at the forward or tapered end. Drag plate 60 forms an annular disc perforated with a plurality of holes 62 proximate the periphery thereof, where the holes 62 break up the wake behind plate 60, disrupting any tendencies to generate periodic wake vortices during fight. As shown in more detail in FIG. 5 plate 60 is attached to the outside of clamp 25 by a plurality of spring clips 61. Frustum 65 is shaped to forma cone of varying included angles, diverging at the open or aft end to an included angle in the order of 75° and tapering at the forward end at an included angle of substantially 20°. Spike 70 forms a cone also of substantially 20° where the angles of taper have been determined by experiment to be respectively below and above the vertical compressibility levels of most soils. On the tapered end frustum 65 is attached to spike 70 forming an integral assembly including an opening which is aligned with a tapped receptacle 71 in spike 70 adapted to mate with one end of a stud 66. Proximate the other end stud 66 engages a nut 67, passing through nut 67 and engaging by the protruding end receptacle 41 in housing 35. Accordingly, stud 66 is initially inserted into the bottom of pan 11 and nut 67 is turned to compress pan 11 to housing 35 forming a sealed interface and replacing bolt 37. Spike 70, affixed to frustum 65, is then threaded onto the one end of stud 66 abutting the open end of frustum 65 with pan 11. In this manner an aerodynamically stable configuration is formed where the combined aerodynamic drag and the weight of assembly determine a preselected terminal velocity. At impact spike 70 penetrates ground without substantially decelerating the assembly. The flared end of frustum 65 forms cone angles at which soil of most hardnesses begins to compress; accordingly, for most soil hardnesses, the penetration will consistently reach the flare of frustum 65 at which point most of the deceleration takes place. Frustum 65 is formed from thin metal stock, or similar material, and therefore deforms at impact as illustrated, absorbing both in hoop and compressive deformation a large part of the deceleration transient. Specifically the open end of frustum 65 is formed to substantially match the bottom diameter of pan 11, and is free to extend and deform over the pan at impact.

Figure 6:
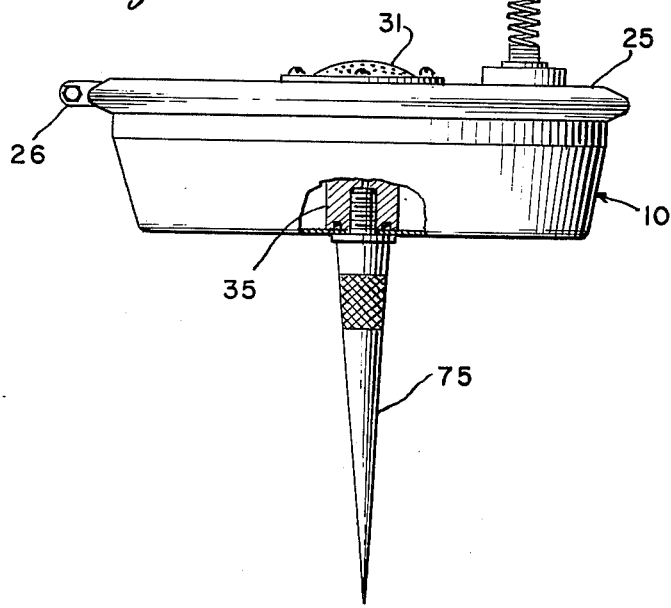
FIG. 6 is a side view in partial cross section of yet another embodiment of the present invention.

As shown in FIG. 6, yet another embodiment of the present invention comprises canister 10 having threadably attached thereto a hand implant tip 75 tapered to form a cone and threaded at the base thereof to mate with receptacle 41. The shoulder at the base of tip 75 compresses the bottom of pan 11 against seal 44. Tip 75 forms a narrow cone, easily implantable into ground, providing a rigid transfer path to seismometer 45.

The operation of the present invention will now be described with reference to FIGS. 1 through 6 inclusive. Canister 10 is combined in three embodiments for three deployment conditions which encompass most deployment conditions encountered in ground warfare. In its first embodiment canister 10 is inserted into a flotation ring or collar 51 and an anchor assembly 55 is attached to clamp 25 for deployment in water. Flotation collar 51 can be any conventional low density material, preferably material that is also utilized for packaging during transportation. In this embodiment canister 10 is deployed in an upright position, resting on the collar at the lower edge of clamp 25 and the location of battery 12 at the bottom of pan 11 provides the necessary ballast.

Figure 5:
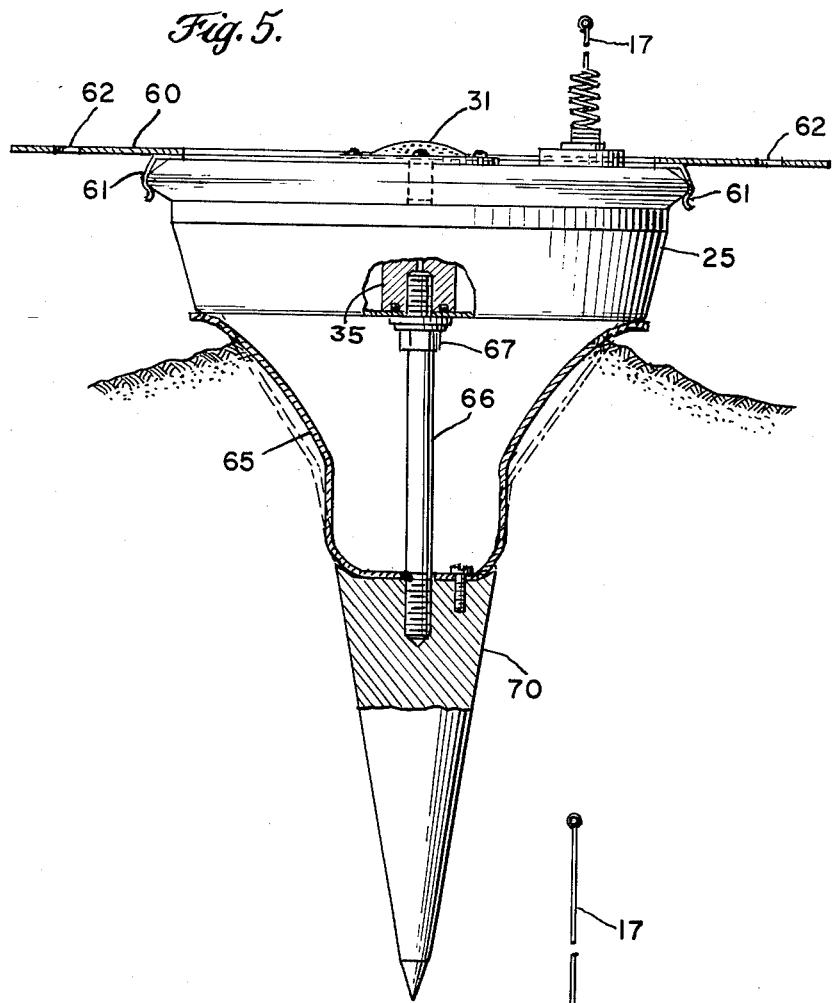
FIG. 5 is a side view in partial cross section of the embodiment shown in FIG. 4.

As shown in FIGS. 4 and 5 another embodiment of the present invention comprises canister 10 in combination with a solid metal penetration spike 70 and a drag plate 60 forming a stable aerodynamic configuration which can be deployed from aircraft to free-fall to ground, where the configuration is sized for a predetermined terminal velocity as follows:

$$V_T = \sqrt{2W/\rho C_{Do} S} \tag{1}$$

where $V_T$ is the terminal velocity, $W$ is the weight of the embodiment, $\rho$ is the density of the atmosphere, $C_{Do}$ is the drag coefficient and $S$ is the reference area of plate 60. Spike 70 in this configuration is sized to provide a forward center of gravity relative to the aerodynamic center of pressue and the drag plate is configured to produce a relatively stable wake such that lateral oscillations are kept to a minimum during flight. The cone frustum 65 intermediate the spike 70 and the assembly 10, is flared to a larger cone angle at the aft end assuring a relatively consistent penetration depth throughout a wide range of soil hardnesses. Furthermore, cone frustum 65 is formed from thin deformable metal and is not restrained laterally at the aft end being free to deform on impact, thereby absorbing the impact transient through deformation. This particular feature allows controlled impact loads while at the same time permitting a hard connection to the forward spike 70 through stud 66, thereby permitting efficient transfer of seismic noise to the seismometer 45.

As shown in FIG. 6 yet another embodiment of the present invention is configured for easy transport and assembly by personnel, assembled to form a configuration which is easily implanted manually into the ground. In this configuration, the tip forms a narrow cone which easily penetrates the ground and is easily inserted to a depth where the bottom of pan 11 is in firm contact.

Some of the many advantages of the present invention should now be readily apparent. Specifically the invention includes a basic instrument package or canister which is easily reconfigured to fit most needs in military operations. In this manner the all-important logistics problem is satisfied. The basic canister is easily modified to a waterborne configuration, an airdrop configuration and a manually emplaced configuration by insertion and attachment of relatively simple components. Furthermore, the airdropped configuration forms a stable aerodynamic body which consistently attenuates ground impact so that survival of the electronics is assured.

Obviously many modifications and variations of the present invention are possible in view of the above teachings. It is therefore to be understood that within the scope of the appended claims the invention may be practiced otherwise than as specifically described.

What is claimed is:

1. A remote detector for sensing and transmitting acoustic and seismic signals comprising, in combination:
    canister means including a pan and a lid covering said pan for forming a first housing, and a second housing within said first housing connected at one end to said lid and at the other end to said pan proximate the respective centers thereof having a first cavity in abutting relationship with said lid and a second cavity in abutting relationship with said pan;
    microphone means mounted in said first cavity for sensing acoustic signals;
    seismometer means mounted in said second cavity for sensing seismic signals; and
    transmission means including an antenna mounted on said lid, operatively connected to receive the output signals from said microphone means and said seismometer means for simultaneously transmitting an acoustic and a seismic signal.

2. A remote detector according to claim 1 further comprising:
    a circular drag plate releasably attached to said lid and extending beyond the periphery thereof; and
    conical penetration means having a base attached to said pan and having the central axis thereof aligned with the central axis of said drag plate for forming a cone weighted at the tapered end to provide a center of gravity of the combination of said canister means and said penetration means substantially forward of the aerodynamic center of pressure.

3. A remote detector according to claim 2 further comprising:
    said conical penetration means including a solid metal conical spike, a thin-walled cone frustum flared to wider cone angles at the base thereof to substantially conform with the dimensions of said pan and attached at the tapered end thereof to the base of said spike and a stud connected at one end thereof to the base of said spike and connected at the other end thereof to said pan for compressing said frustum between said pan and said spike.

4. A remote detector according to claim 3 further comprising:
    said lid including a convoluted periphery formed to register with said pan;
    a ring seal formed to conform with the periphery of said lid; and
    a hoop clamp surrounding the periphery of said lid and said pan for urging said lid and pan towards each other.

5. A remote detector according to claim 1 further comprising:
    a circular flotation collar formed to mate with the peripheral sides of said pan; and
    anchoring means connected to said canister means.

6. A remote detector according to claim 5 further comprising:
    said anchoring means including an anchor line connected at one end to said lid and an anchor connected to the other end of said anchor line.

7. A remote detector according to claim 6 further comprising:
    said lid including a convoluted periphery formed to register with said pan;
    a ring seal formed to conform with the periphery of said lid; and
    a hoop clamp surrounding the periphery of said lid and said pan for urging said lid and pan towards each other.

8. A remote detector according to claim 1 further comprising:
    said transmission means including an annular circuit board arranged to form a transmitter circuit and dimensioned to conform with said pan, a battery shaped in the form of a toroid to conform with said circuit board on one side thereof and said pan on the other side thereof, a plurality of straps connecting said lid to said circuit board and connecting means for electrically connecting said battery, microphone, seismometer and antenna to said circuit board.

9. A remote detector according to claim 1 further comprising:
    a conical member attached at the base thereof to the bottom external surface of said pan projecting and tapering normally away therefrom.

10. A remote detector according to claim 9 further comprising:
    said lid including a convoluted periphery formed to register with said pan;
    a ring seal formed to conform with the periphery of said lid; and
    a hoop clamp surrounding the periphery of said lid and said pan for urging said lid and pan towards each other.

* * * * *